United States Patent
Yoo et al.

(10) Patent No.: US 8,911,820 B2
(45) Date of Patent: Dec. 16, 2014

(54) FABRICATION METHOD OF ELECTROLYTE IMPREGNANTED CATHODES

(75) Inventors: Jang Yong Yoo, Yongin-si (KR); Bo Hyun Ryu, Daejeon (KR); Hwan Moon, Seongnam-si (KR); Ju Young Youn, Seoul (KR); Mi Young Shin, Daejeon (KR); Ju Heung Kim, Daejeon (KR); Dae Gyo O, Daejeon (KR); Kong Taek Lim, Daejeon (KR); In Gap Jang, Daejeon (KR); Tae Won Lee, Daejeon (KR); Kil Ho Moon, Daejeon (KR)

(73) Assignee: Doosan Heavy Industries & Construction Co., Ltd., Changwon-si (KR)

( * ) Notice: Subject to any disclaimer, the term of this patent is extended or adjusted under 35 U.S.C. 154(b) by 0 days.

(21) Appl. No.: 13/641,384

(22) PCT Filed: Jun. 23, 2010

(86) PCT No.: PCT/KR2010/004066
§ 371 (c)(1),
(2), (4) Date: Jan. 7, 2013

(87) PCT Pub. No.: WO2011/129486
PCT Pub. Date: Oct. 20, 2011

(65) Prior Publication Data
US 2013/0280418 A1 Oct. 24, 2013

(30) Foreign Application Priority Data
Apr. 14, 2010 (KR) .................. 10-2010-0034169

(51) Int. Cl.
| | | |
|---|---|---|
| B05D 5/12 | (2006.01) | |
| H01M 8/02 | (2006.01) | |
| B05D 3/12 | (2006.01) | |
| H01M 4/88 | (2006.01) | |
| H01M 8/14 | (2006.01) | |
| C23C 24/08 | (2006.01) | |
| B05D 3/02 | (2006.01) | |
| B22F 7/00 | (2006.01) | |

(52) U.S. Cl.
CPC . *H01M 8/02* (2013.01); *B05D 3/12* (2013.01); *C23C 24/08* (2013.01); *B05D 3/02* (2013.01); *B22F 7/00* (2013.01); *H01M 4/8803* (2013.01); *H01M 4/8846* (2013.01); *H01M 4/8882* (2013.01); *H01M 4/8896* (2013.01); *H01M 8/145* (2013.01); *H01M 2008/147* (2013.01); *Y02E 60/526* (2013.01)
USPC ....................................... 427/115

(58) Field of Classification Search
USPC ......................................... 427/115
See application file for complete search history.

(56) References Cited

U.S. PATENT DOCUMENTS 2,934,279 A * 4/1960 Nestor et al. .................. 241/200
2,980,749 A * 4/1961 Broers ........................... 429/478

(Continued)

FOREIGN PATENT DOCUMENTS

| EP | 0092766 A1 | 11/1983 |
| EP | 1 595 858 A1 | 11/2005 |

(Continued)

OTHER PUBLICATIONS

Search Reported dated Mar. 25, 2014 issued in corresponding German Application No. 10849890.8.

*Primary Examiner* — Brian K Talbot
(74) *Attorney, Agent, or Firm* — Sughrue Mion, PLLC

(57) ABSTRACT

Disclosed is a method for manufacturing an electrode, that is, a large-sized cathode, used for a molten carbonate fuel cell. In the disclosed method, a substrate and a pressure plate, used for electrolyte impregnation, are surface-treated so as to control the bending and cracking of the electrode during the impregnation of an electrolyte.

7 Claims, 3 Drawing Sheets

(56) References Cited

U.S. PATENT DOCUMENTS

| | | | |
|---|---|---|---|
| 4,710,436 A * | 12/1987 | Nakamura et al. | 429/478 |
| 4,746,481 A * | 5/1988 | Schmidt | 264/82 |
| 6,824,913 B2 * | 11/2004 | Hong et al. | 429/478 |
| 2003/0096155 A1 * | 5/2003 | Hong et al. | 429/41 |
| 2006/0257721 A1 | 11/2006 | Xu et al. | |
| 2007/0196724 A1 * | 8/2007 | Sabattini et al. | 429/46 |
| 2008/0160181 A1 * | 7/2008 | Ryu et al. | 427/115 |
| 2009/0017359 A1 * | 1/2009 | Suzuki | 429/33 |

FOREIGN PATENT DOCUMENTS

| | | |
|---|---|---|
| JP | 60-160572 A | 8/1985 |
| JP | 05-290858 A | 11/1993 |
| JP | 07-201336 A | 8/1995 |
| JP | 2008-166195 A | 7/2008 |
| JP | 2009-277391 A | 11/2009 |
| KR | 10-2009-0067956 A | 6/2009 |
| KR | 2009/067956 * | 6/2009 |
| WO | WO 00/52778 A1 | 9/2000 |

* cited by examiner

FABRICATION METHOD OF ELECTROLYTE IMPREGNANTED CATHODES

TECHNICAL FIELD

The present invention relates to a method for manufacturing a molten carbonate fuel cell, and more particularly to a method for manufacturing a cathode impregnated with eutectic carbonate electrolyte powder.

BACKGROUND ART

A fuel cell is a new electricity generating device that uses a fuel and an oxidant to create electricity by an electrochemical Process. The fuel cell is continuously supplied with a fuel and an oxidant from the external BOP System on the other hand, A general electric cell is exhausted from electrochemical reaction within the electric cell.

A fuel cell includes a molten carbonate fuel cell (MCFC) operating at 500~700° C., a phosphoric acid electrolyte fuel cell operating at 200° C., an alkaline electrolyte fuel cell operating at 100° C. or less, and a polymer electrolyte fuel cell.

The polymer electrolyte fuel cell is divided into a proton exchange membrane fuel cell (PEMFC) using a hydrogen gas as a fuel, and a direct methanol fuel cell (DMFC) using liquid methanol as a fuel.

Like other types of fuel cells, the MCFC shows high efficiency, an environmental friendliness, and a desirable modulation characteristic, and requires a reduced occupied space. Furthermore, the MCFC is operated at a high temperature of 650° C., and thus has advantages which are not expected from a low-temperature type fuel cell (such as a phosphoric acid fuel cell or a polymer fuel cell), as described below.

In other words, the MCFC is advantageous in economical efficiency because it can employ an inexpensive nickel electrode instead of a platinum electrode due to a high-speed electrochemical reaction at a high temperature. Furthermore, the nickel electrode can use, as a fuel, even carbon monoxide which functions as a poisonous material in the platinum electrode, through a Hydrogen gas transfer reaction. Thus, in the MCFC, various fuels such as coal gas, natural gas, methanol, biomass, may be selectively employed.

Also, high-temperature waste heat can be recovered and used through a bottoming cycle using an HRSG (Heat Recovery Steam Generator), thereby improving the heat efficiency of the entire electricity generating system by about 60% or more.

Meanwhile, lithium carbonate ($Li_2CO_3$) and potassium carbonate ($K_2CO_3$), used as raw materials for an electrolyte in a MCFC, have very high melting points, respectively. However, when they are mixed in a predetermined ratio, and made into powder with an average particle size (D50) of 50 μm or less, the melting point is lowered to about 500° C. according to the composition. Accordingly, a carbonate electrolyte used for the MCFC is in a solid state at a room temperature, but is molten and impregnated into matrix pores at an operating temperature of 650° C., thereby causing an electrochemical reaction between an electrode in a solid state with a reactive gas in a gas state.

In a conventional MCFC, a dry-electrolyte powder is molten at a high operating temperature, thereby reducing the height of the stack. This causes damage to configuration elements by an impact, and disadvantages in manufacturing peripheral devices for insulation and piping. Furthermore, the melting of the dry-electrolyte powder increases a contact resistance, and also the contraction of the electrode causes damage due to a thermal shock of a matrix.

Meanwhile, in order to solve the above described problems, Korean Patent Application No. 1999-0034894, titled "A method for impregnating an electrolyte for molten carbonate fuel cell" discloses a method for electrolyte-impregnated cathode by using an electrolyte green sheet manufactured by tape casting. Also, Korean Patent Application No. 2007-0135794 titled "Fabrication method of large-sized electrolyte-containing electrodes for MCFC" discloses a method for impregnating an electrolyte in a cathode by using dry-electrolyte eutectic carbonate powder.

However, these methods require a complicated manufacturing process such as a long-time removal of an organic compound in an oxidizing atmosphere at 450° C., and temperature rise in a reducing atmosphere. Furthermore, a residual carbon is formed on a sintered cathode surface, or causes a defect on the surface. Thus, the methods have a problem in that uniformity and manufacturing efficiency are significantly reduced in a large-sized electrode in mass production.

Also, in manufacture of a large-area electrode according to the methods, electrode contraction occurring during electrolyte impregnation causes the bending and cracking of a large-area cathode. Thus, it is required to solve these problems.

DISCLOSURE OF INVENTION

Technical Problem

The present invention has been made in view of the above-mentioned problems, and the present invention provides a method for manufacturing a large-sized electrolyte-impregnated Cathode which can prevent bending and cracking in the electrolyte-impregnation cathode for a molten carbonate fuel cell.

Technical Solution

In accordance with an aspect of the present invention, there is provided a method for manufacturing electrolyte-impregnation cathode for a molten carbonate fuel cell (MCFC), that is, a large-sized electrolyte-impregnated cathode, the method including the steps of: applying eutectic carbonate electrolyte powder on the cathode; melting and impregnating the electrolyte powder into pores of the cathode; controlling the contact between the electrolyte and a pressure plate, and between the electrolyte and a substrate; and controlling the bending and cracking of the cathode while preventing the cathode from being contracted during the solidification of the electrolyte.

The electrolyte-impregnated cathode for the MCFC is uniformly applied with the eutectic carbonate electrolyte powder (lithium/potassium, lithium/sodium, and lithium/potassium/sodium) with a size of 800 to 950 mm (width)×1200 to 1300 mm (length) by using a dry-powder applicator in such a manner that the electrolyte can be impregnated within a range of about 40 to 80 vol % with respect to the pores of the cathode. Then, the applied thickness of the electrolyte powder may be adjusted within a range of 0.3 to 2.5 mm by a roller so as to improve the packing density of the electrolyte powder. The eutectic carbonate electrolyte powder may include at least two carbonates selected from the group including $Li_2CO_3$, $K_2CO_3$ and $Na_2CO_3$.

The electrolyte is molten through heat-treatment under a reducing atmosphere at 500 to 650° C. and is impregnated into the porous cathode by capillarity. The pressure plate is used to prevent the bending and cracking from occurring, which may be caused by heat-transfer during a cooling process. The use of the pressure plate with a porosity of 10 to 30% according to the heat-treatment temperature may reduce the bending and cracking. When the eutectic carbonate electrolyte powder is layered, its amount may be determined within a range of 40 to 85 vol % with respect to the pores of the cathode for the MCFC.

The substrate and the pressure plate, which is in contact with the cathode, are coated with $Si_3N_4$ and glassy carbon so as to achieve high density. They prevent the cathode from adhering to the substrate or the pressure plate during the solidification of the electrolyte. Herein, the adhesion may be caused by the electrolyte on the surface of the cathode. The substrate or the pressure plate may include ceramic which is stable at 700° C.

Advantageous Effects

In the method for manufacturing a large-sized electrolyte-impregnated cathode, according to the present invention, eutectic carbonate electrolyte powder is impregnated in the cathode for the molten carbonate fuel cell. This improves the uniformity and the manufacturing efficiency as well as the electrolyte distribution within the electrode, thereby simplifying manufacturing processes. Also, a monthly quantity of production can be improved by reduction in bending and cracking. Accordingly, it is possible achieve the effect of reducing the lead time for manufacturing.

BRIEF DESCRIPTION OF THE DRAWINGS

The foregoing and other objects, features and advantages of the present invention will become more apparent from the following detailed description when taken in conjunction with the accompanying drawings in which.

MODE FOR INVENTION

Hereinafter, the manufacturing method of a electrolyte-impregnated cathode for a molten carbonate fuel cell (MCFC), according to exemplary embodiments of the present invention, will be described in detail with reference to the accompanying drawings, but, the present invention is not limited thereto. Various other changes and modifications may be conceived by those skilled in the art without departing the technical spirit and scope of the present invention.

A manufacturing method of a MCFC, according to an exemplary embodiment of the present invention, includes the step of impregnating eutectic carbonate electrolyte powder in pores of a cathode 20 for the fuel cell. This improves the distribution of electrolyte within an electrode for the fuel cell, and also eliminates the probability of height reduction caused by the contraction of a stack.

In general, a method for setting the optimum condition of electrolyte impregnation includes the steps of: calculating the optimum total amount of electrolyte required to be impregnated in the electrode for the fuel cell by measuring the porosity of the fired cathode 20; applying electrolyte powder by the calculated amount of electrolyte by using a dry-powder applicator; improving the packing density by using a roller; performing heat-treatment by setting a gas volume ratio of hydrogen and nitrogen, and a temperature of the heat-treatment; and calculating the pores and the extent of impregnation. Herein, the eutectic carbonate used in the present invention may include a two phase component carbonate such as lithium/potassium, lithium/sodium, or the like, and a three phase component carbonate such as lithium/potassium/sodium.

1. Application of Eutectic Carbonate Electrolyte Powder

Figure 1:
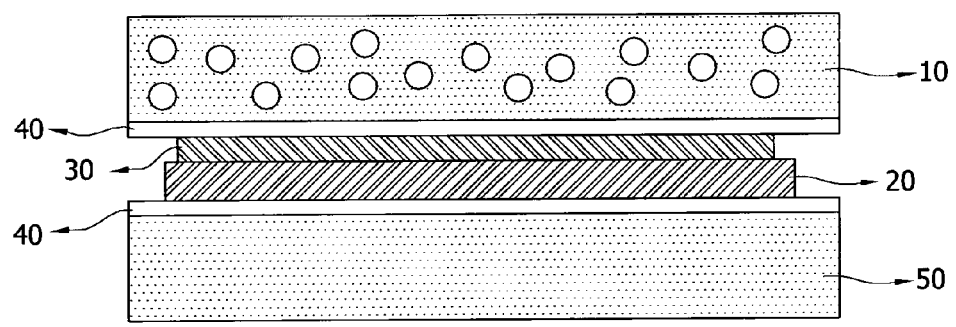
FIG. 1 is a cross-sectional view schematically illustrating the state where a pressure plate is layered on applied eutectic carbonate electrolyte powder in a manufacturing method of a cathode for a molten carbonate fuel cell (MCFC) according to the present invention.

FIG. 1 shows the application of the eutectic carbonate electrolyte powder on the upper surface of the cathode 20 by using a dry-powder applicator, in which an experiment is repeated under the condition of a feeding rate, a feeding speed, a belt speed, and a roll pressure so that the upper surface of the sintered cathode 20 is uniformly packed with electrolyte powder 30.

The optimum operating condition of the dry-powder applicator was set through the experiment in such a manner that the flow rate is to be 0.3 to 0.5 kg/min, the roll gap is to be 1.2 mm, and the belt speed is to be 50 to 100 mm/min.

2. Impregnation Condition and Pressure Plate Dimension

Figure 2:
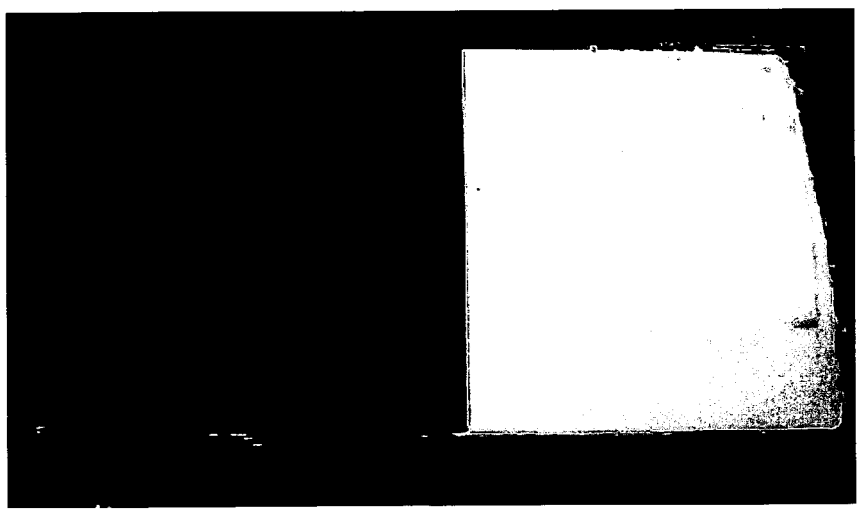
FIG. 2 is a photograph schematically showing the state where the surface of a sintered cathode is applied with eutectic carbonate electrolyte powder in a manufacturing method of a cathode for a MCFC according to the present invention.
Figure 3:
FIG. 3 is a photograph schematically showing raw materials of a eutectic carbonate electrolyte, observed by a scanning electron microscope (SEM), in a manufacturing method of a cathode for a MCFC according to the present invention.

FIG. 2 shows the state where the outer wall of pores of the cathode 20 is impregnated with an electrolyte after the eutectic carbonate electrolyte powder 30 was molten at 500 to 650° C. under a reducing atmosphere of hydrogen and nitrogen gas of 1:99 to 10:80. In FIG. 2, the black area indicates a pressure plate 10, and the white area indicates the electrolyte powder 30 shown by removal of the pressure plate 10. As the pressure plate, a pressure plate with a size of 1100 mm (width)×1500 mm (length)×5 to 15 mm (thickness) is used so that bending and cracking can be controlled while the electrolyte is molten at high temperature and then cooled to room temperature. Also, in order to control the reduction in thickness, a maximum layer weight was set.

EXAMPLE

Hereinafter, a method for manufacturing a cathode for a MCFC, according to an exemplary embodiment of the present invention, will be described.

First, a cathode 20 was prepared by sintering a green sheet of the cathode 20 at 500 to 650° C. for 3 hours under a reducing atmosphere of hydrogen to nitrogen ratio of 4:96. Herein, the green sheet was fabricated through tape casting.

Then, the total pore volume of the electrode was calculated by the Archimedes principle. Next, eutectic carbonate electrolyte powder containing $Li_2CO_3$ and $K_2CO_3$ in a ratio of 62:38 or 70:30 Mol %, which can be filled up to 75% of the pore volume, was applied with 900 mm (width)×1300 mm (length)×1.0 mm (thickness) by using a dry-powder applicator, followed by firing.

Then, in order to prevent bending and cracking from occurring, a high density substrate 50 and a high density pressure plate 10, coated with $Si_3N_4$ and glassy carbon, respectively, were used to cover the applied layer of the electrolyte powder 30, and was subjected to heat-treatment for 3 hours at 500 to 650° C. under a reducing atmosphere of hydrogen and nitrogen, thereby fabricating an electrolyte-impregnated cathode for a MCFC. Herein, the substrate 50 and the pressure plate 10 were used to press the applied eutectic carbonate electrolyte powder.

As described above, the coating of the substrate 50 and the pressure plate 10 with $Si_3N_4$ and glassy carbon prevents the cathode 20 from adhering to the substrate 50 or the pressure plate 10 during an electrolyte solidifying process.

Also, the porosity of the pressure plate 10 was set in a range of 10% to 30%, which is higher than that of the substrate 50. This allowed the pressure plate 10 to minimize the bending and cracking which may be caused by heat-transfer during a cooling process.

Figure 4:
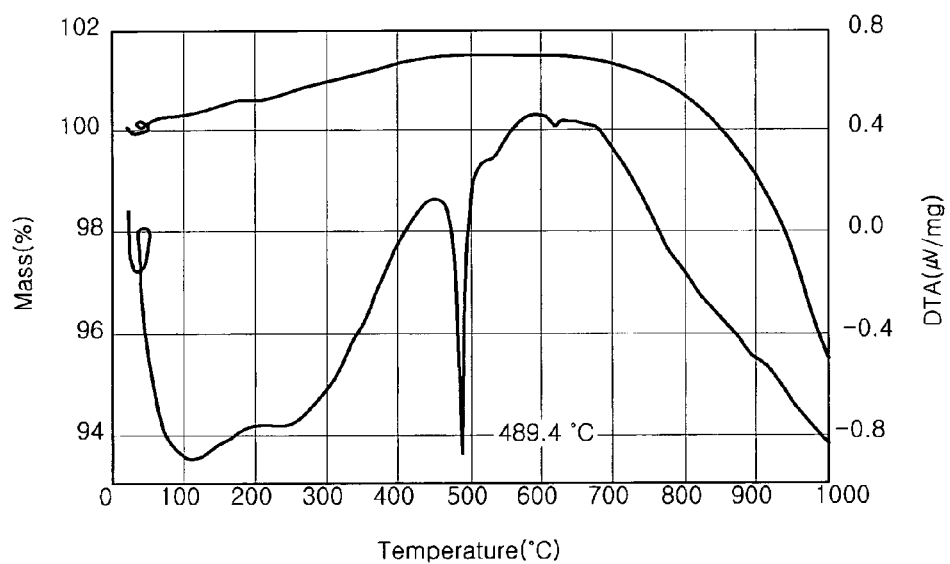
FIG. 4 is a graph showing a thermogravimetric analysis (TGA) on raw materials of a eutectic carbonate electrolyte in a manufacturing method of a cathode for a MCFC according to the present invention.
Figure 5:
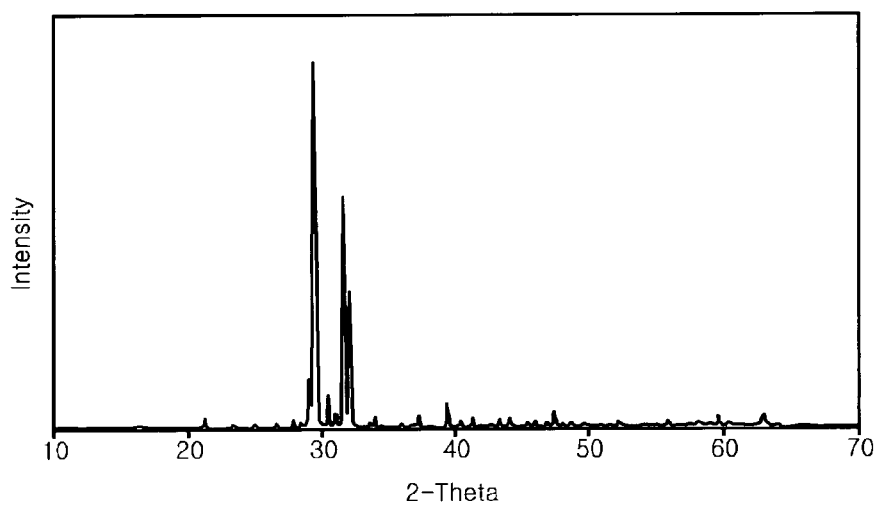
FIG. 5 is an X-ray diffraction (XRD) graph showing raw materials of a eutectic carbonate electrolyte in a manufacturing method of a cathode for a MCFC according to the present invention.

FIG. 4 shows graphs schematically illustrating a thermogravimetric analysis (TGA) and a differential thermal analysis (DTA) on raw materials of a eutectic carbonate electrolyte in a manufacturing method of a cathode for a MCFC, according to the present invention. Herein, the upper one indicates a DTA graph, and the lower one indicates a TGA graph.

INDUSTRIAL APPLICABILITY

The present invention may be applied to a fuel cell, a kind of an electricity generating system, which can generate electrical energy by an electrochemical reaction of a fuel and an oxidant.

The invention claimed is:

1. A method for manufacturing a cathode for a molten carbonate fuel cell (MCFC), that is, an electrolyte impregnated cathode for the MCFC, the method comprising:

uniformly applying eutectic carbonate electrolyte powder on a surface of the cathode; and performing heat-treatment to impregnate an electrolyte into pores of the cathode, wherein in the step of performing the heat-treatment, the applied eutectic carbonate electrolyte powder is pressed by a porous pressure plate having pores isolated from an outside of the pressure plate, and the pressure plate has a coated surface to prevent the cathode from adhering to the pressure plate, and in the step of performing the heat-treatment, the coated surface of the pressure plate covers the applied eutectic carbonate electrolyte powder.

2. The method as claimed in claim 1, wherein the eutectic carbonate electrolyte powder comprises at least two carbonates selected from the group including $Li_2CO_3$, $K_2CO_3$ and $Na_2CO_3$.

3. The method as claimed in claim 1, wherein the pressure plate comprises ceramic which is stable at 700° C.

4. The method as claimed in claim 1, wherein when the eutectic carbonate electrolyte powder is applied, an amount of the eutectic carbonate electrolyte powder is determined within a range of 40 to 85 vol % with respect to the pores of the cathode for the MCFC.

5. The method as claimed in claim 1, wherein in the step of performing the heat-treatment, the eutectic carbonate electrolyte is molten under an atmosphere of hydrogen and nitrogen gas of 1:99 to 10:80 at 500 to 650° C. so as to be impregnated in the cathode.

6. The method as claimed in claim 1, wherein the pressure plate has a porosity of greater than 10% and less than 30%.

7. The method as claimed in claim 1, the pressure plate has a surface coated with glassy carbon and $Si_3N_4$.

\* \* \* \* \*